No. 897,132.
PATENTED AUG. 25, 1908.
A. M. PACEY, DEC'D.
R. PACEY, EXECUTOR.
WIND WHEEL.
APPLICATION FILED JUNE 22, 1907.
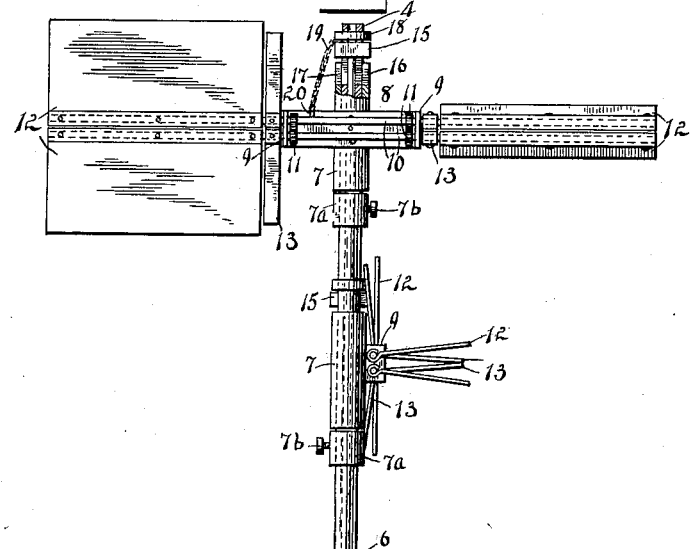
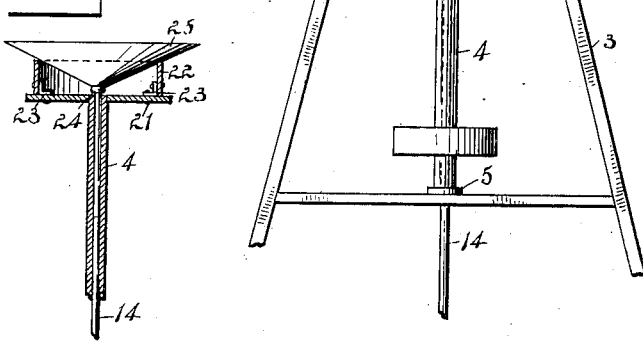
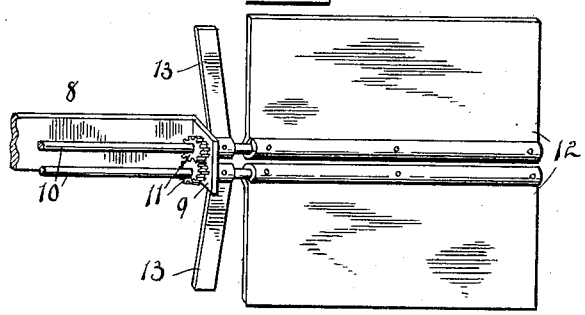
WITNESSES:
INVENTOR

UNITED STATES PATENT OFFICE.

ARTHUR M. PACEY, OF ELMWOOD, ILLINOIS; RICHARD PACEY EXECUTOR OF SAID ARTHUR M. PACEY, DECEASED.

WIND-WHEEL.

No. 897,132.   Specification of Letters Patent.   Patented Aug. 25, 1908.

Application filed June 22, 1907. Serial No. 380,203.

*To all whom it may concern:*

Be it known that I, ARTHUR M. PACEY, citizen of the United States, residing at Elmwood, in the county of Peoria and State of Illinois, have invented certain new and useful Improvements in Wind-Wheels, of which the following is a specification.

My invention relates to prime movers and has special reference to wind driven motors of that type in which the main shaft is vertical and the wheel revolves in a horizontal plane.

The chief objects of my invention are to produce a wind motor that will afford a maximum efficiency with a minimum sail area; to produce a wind wheel that will be simple in construction and therefore have durability since there will be few parts to get out of order and if broken or damaged can be easily and cheaply repaired, and to design a wind mill that can be economically constructed with the use of ordinary tools.

Further objects of my improvement are to provide a device for utilizing wind power of light weight so that it can be easily transported and readily installed without requiring the employment of skilled workmen, and to produce mechanism that will not require a heavy supporting structure.

I accomplish the above and other minor objects by the employment of the apparatus illustrated in the accompanying drawing which forms a part of this specification and in which:—

Figure 1 is an elevational view of my improved feathering wind mill, only so much of the supporting structure being shown as will suffice to indicate the relation of the parts; Fig. 2 is a perspective view of two of the feathering blades, and Fig. 3 is a side elevation, partly in section of the governing device.

Referring to the drawing in detail the numeral 3 indicates the frame of the supporting structure, and 4 a vertical hollow shaft carried by said frame. The shaft rests at its lower end upon a bearing 5 and extends upward through a collar 6. At intervals the said shaft is provided with collars 7ª adjustably secured by set screws 7ᵇ and resting upon these collars are loose sleeves 7 having supporting plates 8 firmly fixed thereto and provided with flanges 9 through which pass parallel shafts 10, there being two of such shafts for each plate 8. These plates are secured to the sleeve so that they are at right angles to each other. The said shafts 10 are journaled in the flanges 9 and are furnished with gears or sprockets 11 which intermesh and cause the said shafts to rotate in unison. Upon the extremities of said shafts are fixedly mounted fans or blades 12, and upon each shaft contiguous to the fan are mounted arms 13, said arms being inclined to the plane of the fans, the angle of such inclination being the same in each case, the deviation of the arms of one shaft, however, being opposite to the deviation of the arms attached to the companion shaft. It will be noticed also, that the blades upon the opposite ends of each shaft lie in planes which are nearly at right angles with each other. The mutual arrangement of said blades and arms is such that when two of the blades at corresponding ends of the shafts are in the same vertical plane the faces of the blades at the opposite ends will approximate but will remain somewhat apart, the angle of such deviation being immediately produced by the arms 13 contiguous thereto, coming in contact with each other, thus limiting the rotation of the shafts and controlling the feathering of the blades. As this feathering action will take place with more or less rapidity depending upon the force of the air currents, if found necessary the arms 13 may be cushioned to deaden the shock with which they come together, but by making them slightly flexible towards the extremities the shock may be lessened sufficiently without recourse to padding.

The central bore of the hollow shaft 4 is occupied by a rod 14 which extends upward to the end of said shaft and above each sleeve is provided with a cross arm 15 firmly fixed thereto and projecting through slots 16 in the walls of said shaft, said slots being of sufficient extent to permit a limited vertical movement of the arm 15 when the rod 14 is reciprocated. The upper end of each sleeve 7 is furnished with opposite slots or notches 17 which are adapted to receive the ends of the said cross arm when the latter is at its lowest position. The function of the rod 14 and cross arm 15 is to lock the sleeve 7 and shaft 4 together so that rotation of the sleeve through the medium of the blades will cause a corresponding rotation of the drive shaft 4 and through the medium of a pulley mounted thereon power may be transmitted to auxiliary machinery.

For the purpose of locking the blades against operation which may be desirable when the wind is of unusually great velocity, I attach short cables or chains 19 to the collars 18 and fasten the other end to a short arm projecting from one of the shafts 10. The slack of the said chain, when the collars 18 are at their lowest positions, will permit of the proper rocking of the shafts but when raised, as shown in Fig. 1, the chains will be tense and hold the blades from operating.

During excessively high winds it is desirable to stop the operation of the mechanism automatically and for this purpose, I have constructed the device illustrated in Fig. 3. To the upper end of the shaft 4 is secured a horizontal circular plate 21 having an upwardly projecting cylindrical flange 22, secured to the plate by angle irons 23. The summit of the rod 14 is provided with a ball and socket joint 24 by means of which the said rod is connected with a cone shaped vane or disk 25, the under surface of which rests upon the margin of the said flange when the rod is lowered. This arrangement and form of the vane presents an equal area of surface to every quarter and from whatever direction a high wind may blow its force will be felt upon the vane and when this force is sufficient it will lift the presented margin of the vane, and this will act as a lever to raise the rod the fulcrum being the point where the vane rests upon the opposite margin of the flange 22.

The method of operation of the apparatus is as follows: The structure having been erected as shown in Fig. 1 with the rod 14 and cross pieces 15 elevated so that the latter are out of engagement with the slots 17, the action of the wind from any quarter upon the open blades of one section will tend to rotate the sleeve 7 and bring the opposite section into action. As the closed blades are brought into the wind's eye the air pressure will have a tendency to force them apart, and at the same time the tendency will be to close the blades upon the opposite ends of the shafts of the same section and through the medium of the gears 11 this action will be equalized so that the angular deviation of the companion blades between an open and a closed position will be the same at all times and the force of the current will be regular so that a practically uniform movement of the sleeve will result. In order to set the vertical shaft 14 in motion the cross arms 15 are brought down until they engage the notches 17 in the sleeves when the said sleeves, the shaft 4 and the rod 14 will rotate together.

It is ovbious that changes may be made in the devices of my invention as herein set forth without departing from the scope and spirit thereof and I do not wish, therefore, to be limited to the precise construction disclosed.

Having thus described my invention what I claim is:—

1. In a wind motor, the combination with a hollow vertical shaft provided with slots, and a sleeve loosely mounted thereon and having notches, of parallel horizontal shafts mounted transversely to said sleeve, gears connecting said rock shafts, blades mounted upon both ends of the rock-shafts, mutually engaging stops fixed to said rock shafts, an operating rod arranged in the hollow shaft, a cross arm on said rod projecting through said slots in the hollow shaft and adapted to engage the notches in said sleeve, means for preventing the operation of said rock-shafts, and a governing vane attached to said operating rod.

2. In a wind motor, the combination with a hollow vertical shaft provided with slots, a sleeve loosely mounted thereon and having notches, and a bracket fixed to said sleeve, of parallel horizontal rock-shafts mounted on said bracket and arranged transversely to said sleeve, gears connecting said rock-shafts, blades mounted upon both ends of the rock shafts, mutually engaging stops on said rock-shafts, an operating rod arranged in the hollow shaft, a cross-arm on said rod projecting through said slots in the shaft and adapted to engage the notches in said sleeve, a conical governing vane and a flexible connection between the vane and said operating rod.

3. A wind-mill, including a vertical hollow shaft, a sleeve carried upon said shaft, a plurality of series of rock shafts journaled in bearings fixed to said sleeve and having blades mounted on their extremities, each of said series of shafts being at right angles to the alternate series, gears connecting the shafts of each series, flexible stops fixed to said rock-shafts and adapted to limit their rotation, an operating rod adapted to move longitudinally in said hollow shaft, and a cross-arm fixed to said rod and adapted to engage slots in the hollow shaft and said sleeve when in operative position.

4. In a wind motor, the combination with a hollow vertical slotted shaft, a plurality of notched sleeves loosely mounted thereon, of two parallel horizontal rock-shafts journaled on each of said sleeves and arranged transversely thereto, gears connecting the shafts on each sleeve, a blade fixed to the opposite ends of each rock-shaft, stops for limiting the rotation of the shafts, an operating rod arranged in the hollow shaft, a cross-arm on said rod projecting through said slots in the shaft and adapted to engage the notches in said sleeve, and a governing device, comprising a cone shaped vane, a flexible connection between the vane and said operating rod, and a support for the vane mounted upon the vertical shaft.

5. A wind-motor, including a vertical hollow shaft, a plurality of sleeves mounted upon said shaft, duplicate horizontal rock-shafts carried by each sleeve and having blades mounted upon their extremities, gears connecting the shafts on each sleeve, stops to limit the movement of said rock-shafts, an operating rod adapted to move longitudinally in said hollow shaft, a plurality of cross arms fixed to said rod and adapted to engage slots in the hollow shaft and said sleeves, means for preventing the operation of the said rock-shaft, and a governing vane attached to said operating rod.

In testimony whereof I affix my signature in the presence of two witnesses.

ARTHUR M. PACEY.

Witnesses:
LLOYD W. HALL,
HARRY L. KELLY.